US012677097B2

(12) United States Patent
Ito et al.

(10) Patent No.: US 12,677,097 B2
(45) Date of Patent: Jul. 7, 2026

(54) TRANSDUCER INCLUDING PIEZOELECTRIC ELEMENT AND METHOD OF PRODUCING SAME

(71) Applicant: ALPS ALPINE CO., LTD., Tokyo (JP)

(72) Inventors: Ryo Ito, Fukushima (JP); Heishiro Fudo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 225 days.

(21) Appl. No.: 18/783,993

(22) Filed: Jul. 25, 2024

(65) Prior Publication Data

US 2025/0048032 A1 Feb. 6, 2025

(30) Foreign Application Priority Data

Aug. 1, 2023 (JP) ................................ 2023-125772

(51) Int. Cl.

*H04R 17/10* (2006.01)
*H04R 7/04* (2006.01)
*H04R 7/16* (2006.01)
*H04R 17/00* (2006.01)
*H04R 31/00* (2006.01)

(52) U.S. Cl.

CPC ................ *H04R 7/04* (2013.01); *H04R 7/16* (2013.01); *H04R 17/00* (2013.01); *H04R 31/003* (2013.01)

(58) Field of Classification Search

CPC ...... H04R 17/00; H04R 17/005; H04R 17/10; H04R 2217/03; H10N 30/2047

See application file for complete search history.

(56) References Cited

U.S. PATENT DOCUMENTS

| | | | | |
|---|---|---|---|---|
| 5,767,612 | A | 6/1998 | Takeuchi et al. | |
| 6,011,855 | A * | 1/2000 | Selfridge | H04R 17/00 310/324 |
| 6,321,428 | B1 * | 11/2001 | Toda | B06B 1/0688 29/25.35 |
| 10,516,943 | B2 * | 12/2019 | Dorfmeister | H04R 31/00 |

(Continued)

FOREIGN PATENT DOCUMENTS

| | | | | |
|---|---|---|---|---|
| CN | 112871613 A * | 6/2021 | | B06B 1/06 |
| DE | 10109932 A1 * | 8/2022 | | H04R 17/00 |

(Continued)

OTHER PUBLICATIONS

Extended European Search Report for EP24190668.4 mailed on Dec. 6, 2024.

*Primary Examiner* — Ryan Robinson
(74) *Attorney, Agent, or Firm* — IPUSA, PLLC

(57) ABSTRACT

A transducer includes a flexible substrate, a piezoelectric element formed on a surface of the flexible substrate, and a support member, in which holes are formed, having a higher rigidity than the flexible substrate. The surface of the flexible substrate has an element region in which the piezoelectric element is continuous in a planar direction of the piezoelectric element. The support member is stacked to the flexible substrate in a manner such that the holes face the element region. The flexible substrate is freely movable in each of the holes, and a region of the flexible substrate corresponding to a region other than the holes of the support member is fixed to the support member.

8 Claims, 5 Drawing Sheets

(56) References Cited

U.S. PATENT DOCUMENTS

| | | | | |
|---|---|---|---|---|
| 2004/0052387 | A1* | 3/2004 | Norris | H04R 17/005 381/345 |
| 2005/0100181 | A1* | 5/2005 | Croft, III | H04R 17/10 381/190 |
| 2010/0219722 | A1 | 9/2010 | Onishi et al. | |
| 2016/0013394 | A1* | 1/2016 | Savoia | B06B 1/0622 29/25.35 |
| 2017/0119349 | A1* | 5/2017 | Miyazawa | G01S 7/52082 |
| 2022/0037585 | A1 | 2/2022 | Han et al. | |

FOREIGN PATENT DOCUMENTS

| | | | | |
|---|---|---|---|---|
| WO | WO-2020062383 | A1 * | 4/2020 | B06B 1/06 |
| WO | 2020/202351 | | 10/2020 | |

* cited by examiner

TRANSDUCER INCLUDING PIEZOELECTRIC ELEMENT AND METHOD OF PRODUCING SAME

CROSS-REFERENCE TO RELATED APPLICATIONS

This patent application is based on and claims priority to Japanese Patent Application No. 2023-125772 filed on Aug. 1, 2023, the entire contents of which are incorporated herein by reference.

TECHNICAL FIELD

The present disclosure relates to a transducer using a piezoelectric element, which can be used as a speaker, a sensor, or the like.

BACKGROUND

International Publication No. WO 2020/202351 discloses an invention related to an ultrasonic transducer. The disclosed ultrasonic transducer includes an elastic plate having elasticity that allows the elastic plate to vibrate in a thickness direction of the elastic plate. The elastic plate is formed of stainless steel, a Ni—Fe alloy, an aluminum alloy, a titanium alloy, a carbon fiber-reinforced plastic, ceramic, or the like. Piezoelectric elements are fixed to a first surface of the elastic plate in a state in which the piezoelectric elements are aligned in parallel in a planar direction of the elastic plate. Each piezoelectric element includes a piezoelectric body formed of PZT, a pair of an upper electrode layer and a lower electrode layer disposed on both sides of the piezoelectric body in a thickness direction of the piezoelectric body. Moreover, the piezoelectric element includes a sealing member having tubes that respectively surrounds the piezoelectric elements in a plan view, and a flexible wiring board serving as a voltage supply channel for the piezoelectric elements.

The elastic plate has vibration regions, low-rigidity regions, and constraining regions. The piezoelectric elements are respectively mounted on the vibration regions. The low-rigidity regions respectively surround the vibration regions. The constraining regions respectively surround the low-rigidity regions. A slit is formed in a boundary region of the elastic plate, where the boundary region is positioned outward of the constraining region in a diameter direction. Since the piezoelectric elements are respectively disposed on the vibration regions respectively surrounded by the low-rigidity regions, the multiple vibration regions can be disposed in close proximity to each other.

In the ultrasonic transducer disclosed in International Publication No. WO 2020/202351, the vibration regions are disposed on the first surface of the elastic plate in close proximity to each other. However, the piezoelectric elements are individually fixed to corresponding vibration regions. Moreover, a flexible wiring board is disposed on the surface of the elastic plate, and the flexible wiring board needs to be individually wired to each of the piezoelectric elements. Therefore, a production process becomes very complicated.

The present disclosure aims to solve the above problems existing in the art, and to provide a transducer using piezoelectric element, in which a plurality of vibration portions can be formed using a piezoelectric element without individually providing a large number of piezoelectric elements, and a method of producing such transducer.

SUMMARY

According to one aspect of the present disclosure, a transducer includes a flexible substrate, a piezoelectric element formed on a surface of the flexible substrate, and a support member, in which holes are formed, having a higher rigidity than the flexible substrate. The surface of the flexible substrate has an element region in which the piezoelectric element is continuous in a planar direction of the piezoelectric element. The support member is stacked to the flexible substrate in a manner such that the holes face the element region. The flexible substrate is freely movable in each of the holes, and a region of the flexible substrate corresponding to a region other than the holes of the support member is fixed to the support member.

BRIEF DESCRIPTION OF THE DRAWINGS

Other objects and further features of the present disclosure will be apparent from the following detailed description when read in conjunction with the accompanying drawings, in which.

DETAILED DESCRIPTION OF EMBODIMENTS

Figure 1:
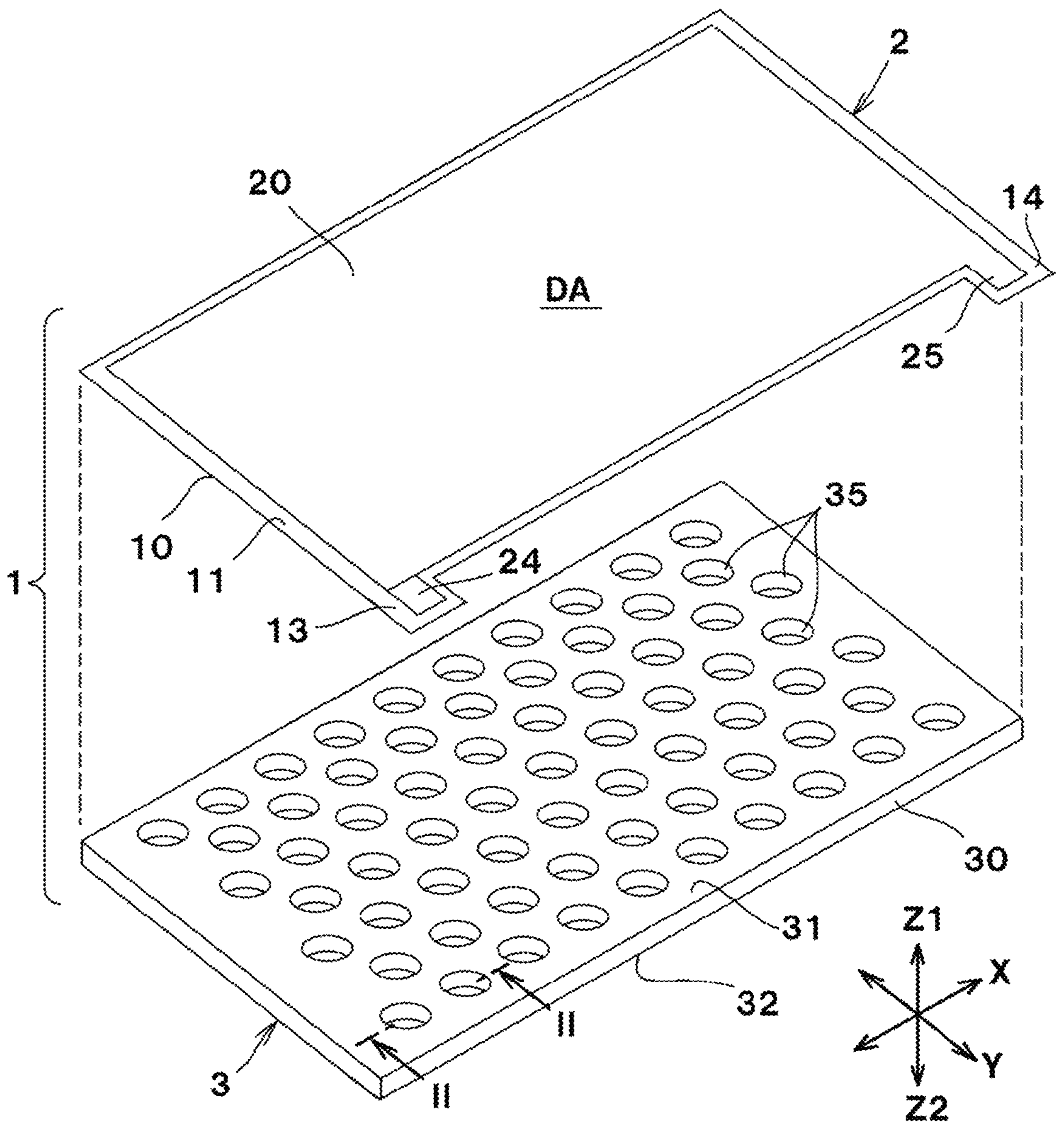
FIG. 1 is an exploded perspective view illustrating a transducer including a piezoelectric element of a first embodiment of the present disclosure.

In the transducer including the piezoelectric element of the present disclosure, inner diameters of the holes facing the element region are preferably identical.

The transducer including the piezoelectric element of the present disclosure further includes another support member to include two support members. The two support members are stacked to both surfaces of the flexible substrate, respectively, in a state in which a center of each of the holes of one of the two support members matches with a center of each of the holes of the other support member, and a region of each of the two support members where the holes are not formed is fixed to the corresponding surface of the flexible substrate.

The transducer including the piezoelectric element of the present disclosure may be configured such that the support member stacked to the element region is curved.

Moreover, the present disclosure is directed to a method of producing a transducer, which includes: forming an element region, in which a piezoelectric element is continuous in a planar direction, on a surface of a flexible substrate; forming a support member, in which holes are formed, using a material having a rigidity higher than the flexible substrate;

and stacking the flexible substrate to the support member in a manner such that the holes face the element region, allowing the flexible substrate to move freely in the holes, and fixing a region of the flexible substrate, which corresponds to a region other than the holes of the support member, to the support member, to produce the transducer including the flexible substrate, and the piezoelectric element formed on the surface of the flexible substrate.

In the method of producing the transducer of the present disclosure, the forming of the element region includes stacking a lower electrode layer, a piezoelectric material layer, and an upper electrode layer on the surface of the flexible substrate in this order.

In the method of producing the transducer of the present disclosure, the forming of the element region includes disposing a lower electrode layer on a lower surface of a piezoelectric material layer including a polymer piezoelectric material, and disposing an upper electrode layer on an upper surface of the piezoelectric material layer to form the piezoelectric element, and fixing the piezoelectric element to the surface of the flexible substrate.

The method of producing the transducer of the present disclosure may further include curving the support member before or after stacking of the flexible substrate to the support member.

In the transducer of the present disclosure, the element region, in which the piezoelectric element is continuous in the planar direction, is formed on the surface of the flexible substrate, the support member having the holes is stacked to the surface of the flexible substrate, the regions of the element region facing the holes function as vibration portions. Since substantially separated multiple vibration portions can be formed with one element region, it is not necessary to form a plurality of small piezoelectric elements. Moreover, it is not necessary to individually wire the vibration portions to a wiring member. Accordingly, a transducer having multiple vibration portions can be formed at low cost.

Figure 2:
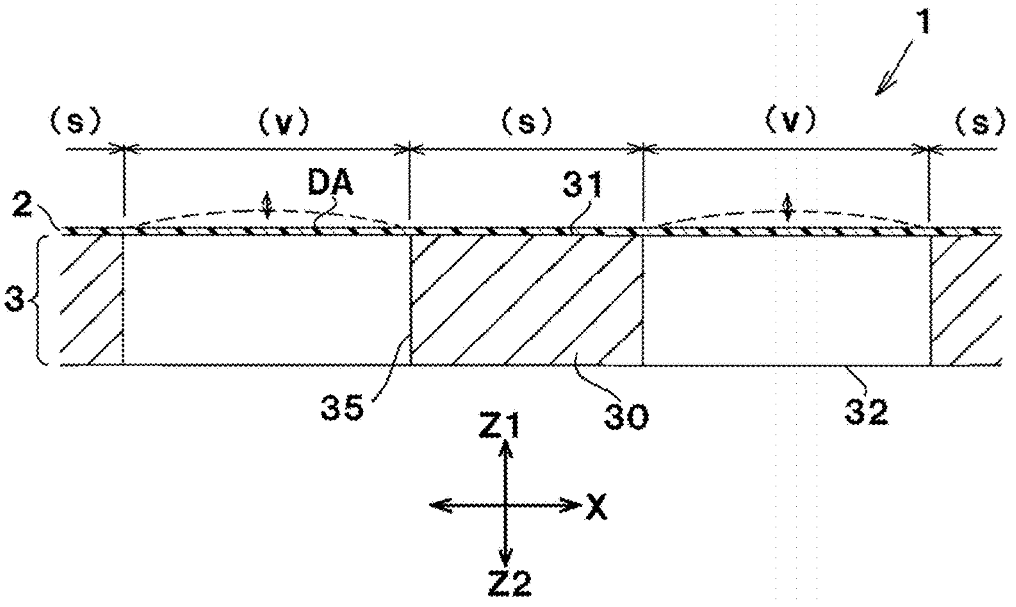
FIG. 2 is a partial cross-sectional view taken along the line II-II, illustrating a state where the transducer illustrated in FIG. 1 is assembled.

The transducer 1 of the first embodiment of the present disclosure is illustrated in FIGS. 1 and 2. The transducer 1 includes a piezoelectric sheet 2 and a support member 3, which are stacked together. The piezoelectric sheet 2 includes a flexible substrate 10. The flexible substrate 10 is an organic resin film having an elasticity and being deflection-deformable, such as a polyimide film or the like. As illustrated in an enlarged cross-sectional view of FIG. 4, the flexible substrate 10 has a first surface 11 facing the Z1 direction and a second surface 12 facing the 22 direction. The piezoelectric element 20 is fixed on the first surface 11. As illustrated in FIG. 1, the flexible substrate 10 has a square shape in a plan view, and the piezoelectric element 20 fixed to the first surface 11 has also a square shape. The piezoelectric element 20 is formed to be continuous in a planar direction over a large area on the first surface 11 of the flexible substrate 10. A region of the first surface 11, in which the piezoelectric element 20 is continuously formed in the planar direction, is an element region DA.

Figure 4:
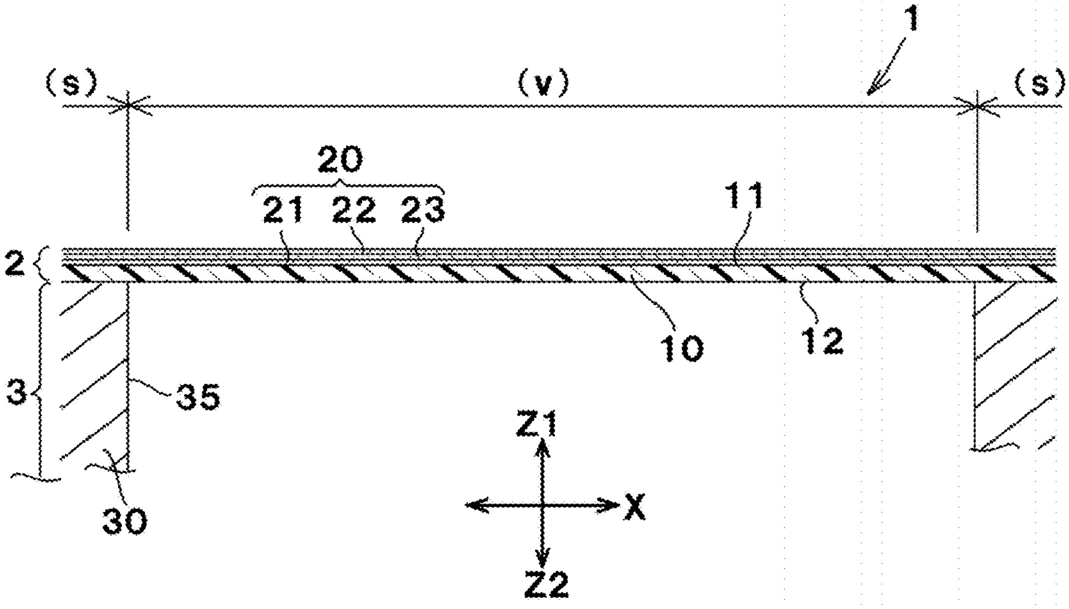
FIG. 4 is an enlarged cross-sectional view illustrating a detailed configuration of a piezoelectric sheet used in the transducer illustrated in FIG. 2.

As illustrated in FIG. 4, the piezoelectric element 20 includes a lower electrode layer 21 fixed to the first surface 11 of the flexible substrate 10, a piezoelectric material layer 23 stacked on a surface of the lower electrode layer 21, and an upper electrode layer 22 stacked on a surface of the piezoelectric material layer 23. A method of producing the piezoelectric element 20 includes formation of a conductive metal layer, such as a copper layer, a silver layer, a gold layer, or the like, on the first surface 11 of the flexible substrate 10 by a method, such as vapor deposition, sputtering, or the like, to produce the lower electrode layer 21. On the surface of the lower electrode layer 21, a ferroelectric ceramic, such as barium titanate, zirconate, lead zirconate titanate, or the like, is fired to form the piezoelectric material layer 23. On the surface of the piezoelectric material layer 23, the upper electrode layer 22 is formed by a method, such as vapor deposition, sputtering, or the like. The piezoelectric material layer 23 is subjected to a polarization treatment in which an electric field is applied to polarize the piezoelectric material layer 23 in a thickness direction (Z direction). Alternatively, the piezoelectric material layer 23 may be formed of a piezoelectric polymer material, such as polyvinylidene fluoride, the lower electrode layer 21 and the upper electrode layer 22 may be stacked onto the film-like piezoelectric material layer 23 to form the piezoelectric element 20, and the piezoelectric element 20 may be bonded to the first surface 11 of the flexible substrate 10. A polarization treatment is also performed on the piezoelectric material layer 23 produced in the above manner by applying an electric field to the piezoelectric material layer 23 to polarize in the film thickness direction (Z direction).

As illustrated in FIG. 1, extensions 13 and 14 are formed at the flexible substrate 10. A lower surface terminal 24 is formed on the first surface of the extension 13, and an upper surface terminal 25 is formed on the first surface of the extension 14. The lower surface terminal 24 is a conductive metal layer. The lower surface terminal 24 is formed to be continuous with the lower electrode layer 21 as a single body to thereby connect with the lower electrode layer 21, or is formed as a separate body and is connected to the lower electrode layer 21. The upper surface terminal 25 is also a conductive metal layer. The upper surface terminal 25 is formed to be continuous with the upper electrode layer 22 as a single body to thereby connect to the upper electrode layer 22, or is formed as a separate body and is connected to the upper electrode layer 22.

The support member 3 illustrated in FIGS. 1 and 2 includes a support plate 30. The support plate 30 has a higher rigidity than the flexible substrate 10, and is sufficiently thicker than the flexible substrate 10. The support plate 30 is a metal plate, such as a stainless steel plate, or a synthetic resin plate, such as an epoxy-based resin plate. The support plate 30 has a first surface 31 facing the Z1 side and a second surface 32 facing the Z2 side that is in an opposite direction to the Z1 side. The piezoelectric sheet 2 is stacked on the first surface 31. Holes 35 are formed in the support plate 30. A center line of each hole 35 is vertical to the first surface 31 and the second surface 32, and each hole 35 is formed through the support plate 30. The holes 35 are aligned at a constant pitch in a first direction (X direction along the first surface 31, and are also aligned at a constant pitch in a second direction (Y direction) orthogonal to the first direction.

Each hole 35 is a cylindrical hole having a constant inner diameter from the first surface 31 to the second surface 32 of the support plate 30. All of the holes 35 have the identical inner diameter (inner hole size). Moreover, each hole 35 may have a tapered shape where an inner diameter gradually increases from the first surface 31 fixed on the piezoelectric sheet 2 to the second surface 32 that is an opposite side of the first surface 31. In this case, all of the holes 35 have the identical opening diameter at the first surface 31.

As illustrated in FIG. 2, the piezoelectric sheet 2 is bonded to and fixed on the first surface 31 of the support plate 30 constituting the first support member 3 to thereby form the transducer 1. The element region DA of the piezoelectric sheet 2 is continuously present in a predetermined area along the sheet surface. The support plate 30 and the piezoelectric sheet 2 are bonded and fixed together in a manner such that the holes 35 face the element region DA.

In the region of the support member 3 where the holes 35 are not formed, the element region DA of the piezoelectric sheet 2 is bonded to and fixed on the first surface 31 of the support plate 30. The regions of the element region DA of the piezoelectric sheet 2 facing the holes 35 of the support member 3 are not fixed to the first surface 31 of the support plate 30, and are in a freely movable state. Specifically, the flexible substrate 10 and the piezoelectric element 20 are in a freely movable state inside each hole 35. Portions of the element region DA of the piezoelectric sheet 2 facing the regions where the holes 35 are formed function as vibration portions (v). The regions where the holes 35 are not formed constitute constraining portions(s) in which the piezoelectric sheet 2 is fixed on the first surface 31 of the support plate 30. When a group of vibration portions (v) are observed, all of the vibration portions (v) have a circular shape and have the identical diameter. In each constraining portion(s), the entire surface of the element region DA corresponding to the region between the adjacent holes 35 is fixed on and restrained by the first surface 31 of the support plate 30 so that the movement of the flexible substrate 10 and the piezoelectric element 20 is restricted.

Next, the operation of the transducer 1 will be described.

Once an AC voltage is applied between the lower surface terminal 24 and the upper surface terminal 25 of the piezoelectric sheet 2, the voltage between the lower electrode layer 21 and the upper electrode layer 22 acts on the piezoelectric material layer 23 in the thickness direction within the element region DA. Since the polarization direction of the piezoelectric material layer 23 is the thickness direction, a strain is generated in the piezoelectric material layer 23, to which the voltage is applied. Since the piezoelectric sheet 2 is freely movable within the holes 35 in the vibration portions (v), the piezoelectric sheet 2 is curved and deformed to vibrate as indicated with a dashed line in FIG. 2 due to a difference in a volume change between the strained piezoelectric element 20 and the flexible substrate 10. Since the element region DA is fixed on the first surface 31 of the support plate 30 in the constraining portions(s), the piezoelectric sheet 2 is not curved in the thickness direction.

When the transducer 1 is used as a piezoelectric speaker, pressure waves are generated from the vibration portions (v) due to flexural vibrations of the piezoelectric sheet 2. In each vibration portion (v), the piezoelectric sheet 2 positioned inside the hole 35 has a certain resonance frequency according to a mass and elastic modulus of the piezoelectric sheet 2. Therefore, the piezoelectric sheet 2 can be vibrated with high sensitivity by applying an AC voltage of a specific frequency band including the resonance frequency to the piezoelectric sheet 2. Although outputs of the pressure waves may be low with only one vibration portion (v), the multiple vibration portions (v) having the same diameter and the same resonance frequency vibrate in synchronization with each other so that the pressure waves can be generated at a high output as the entire transducer 1.

For example, the transducer 1 is used as a parametric speaker constituting a highly directional acoustic system. This speaker performs FM modulation or AM modulation on, for example, ultrasonic waves of 40 kHz, and reproduces sound in an audible range in a space where two ultrasonic waves intersect, or causes audible sound to appear due to a nonlinear characteristic when ultrasonic waves propagate through the air. Since the transducer 1 of the present embodiment can emit ultrasonic waves synchronized with each other from the multiple vibration portions (v), the output of ultrasonic waves can be increased, and audible sound can be reproduced at a relatively high output.

In the transducer 1 of the first embodiment illustrated in FIGS. 1 and 2, the Z1 side where the piezoelectric sheet 2 is disposed may be used as a sound emitting direction (pressure-wave transmitting direction), or the Z2 side where the support member 3 is disposed may be used as a sound emitting direction. In a case where the 22 side is used as a sound emitting direction, the directivity of pressure waves can be further enhanced by forming each hole 35 as a long cylindrical hole extending in the Z direction. In a case where the Z2 side is used as a sound emitting direction, a shape of each hole 35 may be a tapered shape in which an inner diameter is gradually increased toward the Z2 side.

Figure 5:
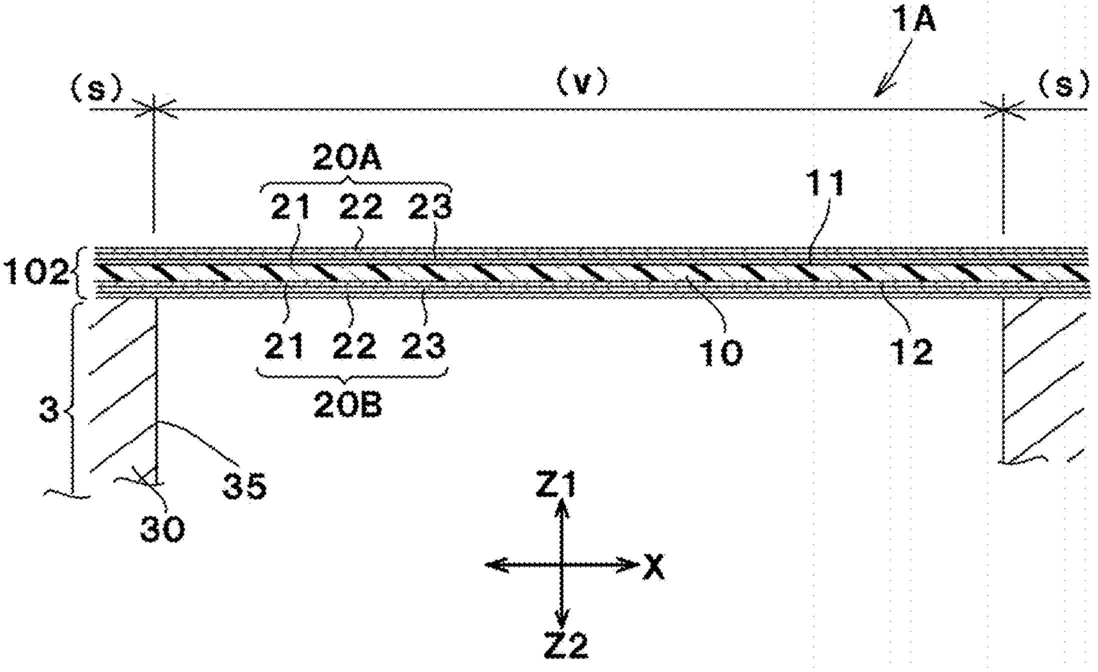
FIG. 5 is an enlarged cross-sectional view illustrating a modified example of the configuration of the piezoelectric sheet used in the transducer illustrated in FIG. 2.

A piezoelectric sheet 102, which is a modified example, is used in a transducer 1A illustrated in FIG. 5. The piezoelectric sheet 102 is stacked and fixed onto the first surface 31 of the support plate 30 constituting the support member 3. In the piezoelectric sheet 102, a piezoelectric element 20A is stacked on the first surface 11 of the flexible substrate 10, and a piezoelectric element 20B is stacked on the second surface 12 of the flexible substrate 10. Each of the piezoelectric element 20A and the piezoelectric element 20B has a configuration in which the piezoelectric material layer 23 is interposed between the lower electrode layer 21 and the upper electrode layer 22. In the transducer 1A, AC voltages having reversed phases are applied to the piezoelectric element 20A and the piezoelectric element 20B of the piezoelectric sheet 102. When a positive strain is generated in the formed piezoelectric element 20A, a negative strain is generated in the piezoelectric element 20B. When a negative strain is generated in the piezoelectric element 20A, a positive strain is generated in the piezoelectric element 20B. Therefore, the piezoelectric sheet 102 can be vibrated with high sensitivity within the vibration portions (v).

Figure 3:
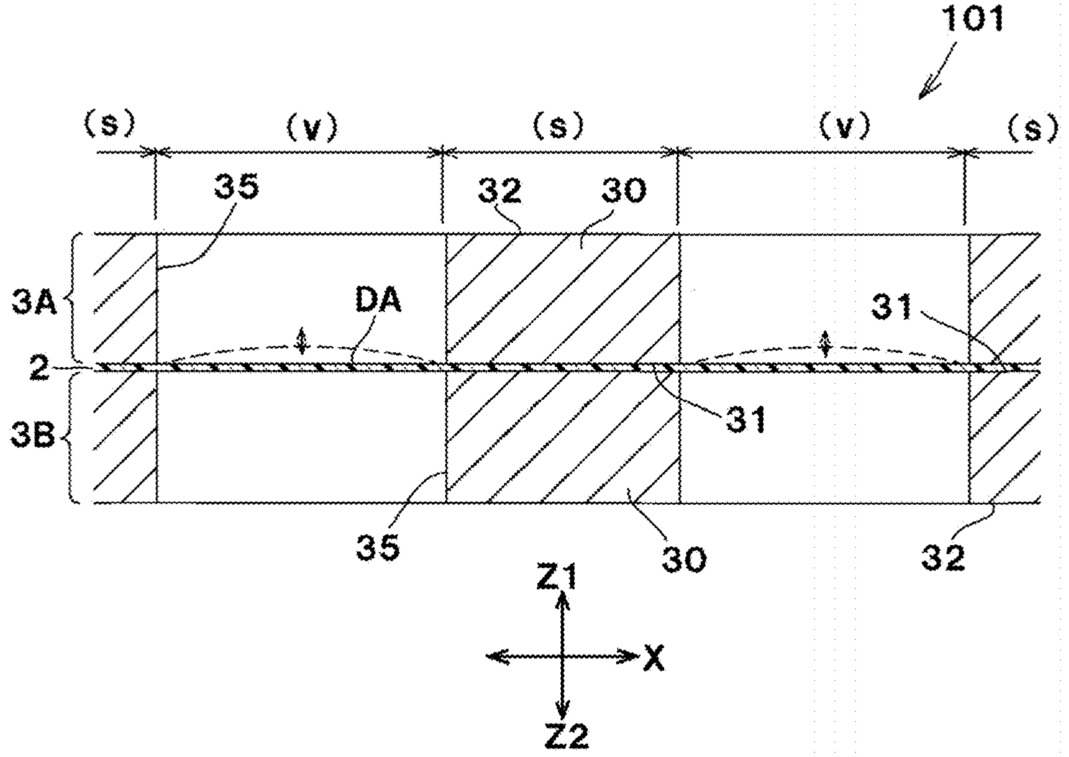
FIG. 3 is a partial cross-sectional view illustrating the transducer including the piezoelectric element of a second embodiment of the present disclosure.

A transducer 101 of the second embodiment of the present disclosure illustrated in FIG. 3 includes the piezoelectric sheet 2 illustrated in FIG. 4 or the piezoelectric sheet 102 illustrated in FIG. 5 interposed between a support member 3A and a support member 3B. Holes 35 formed in the support plate 30 of the support member 3A and holes 35 formed in the support plate 30 of the support member 3B have the identical inner diameter. As illustrated in FIG. 3, the support members 3A and 3B are positioned so that centers of the holes 35 of the support member 3A match with corresponding centers of the holes 35 of the support member 3B in the Z direction. The element region DA of the piezoelectric sheet 2 is bonded to and fixed on both the support member 3A and the support member 3B in the constraining portions(s). Since the transducer 101 can fix and restrain the element region DA with two support members 3A and 3B, generation of a strain in the thickness direction of the piezoelectric material layer 23 can be suppressed in the constraining portions(s) so that an adverse effect of the strain to vibrations of the piezoelectric sheet 2 in the vibration portions (v) can be minimized.

Figure 6:
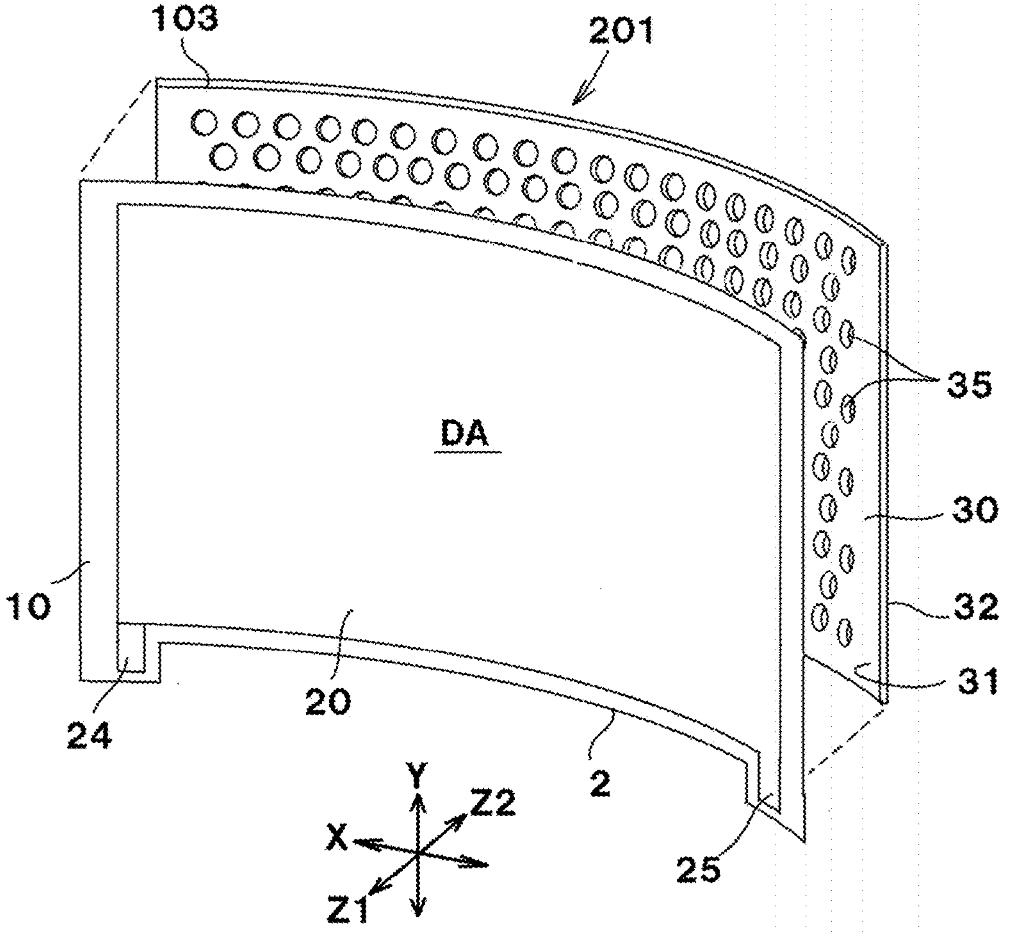
FIG. 6 is an exploded perspective view illustrating the transducer including the piezoelectric element of a third embodiment of the present disclosure.
Figure 7:
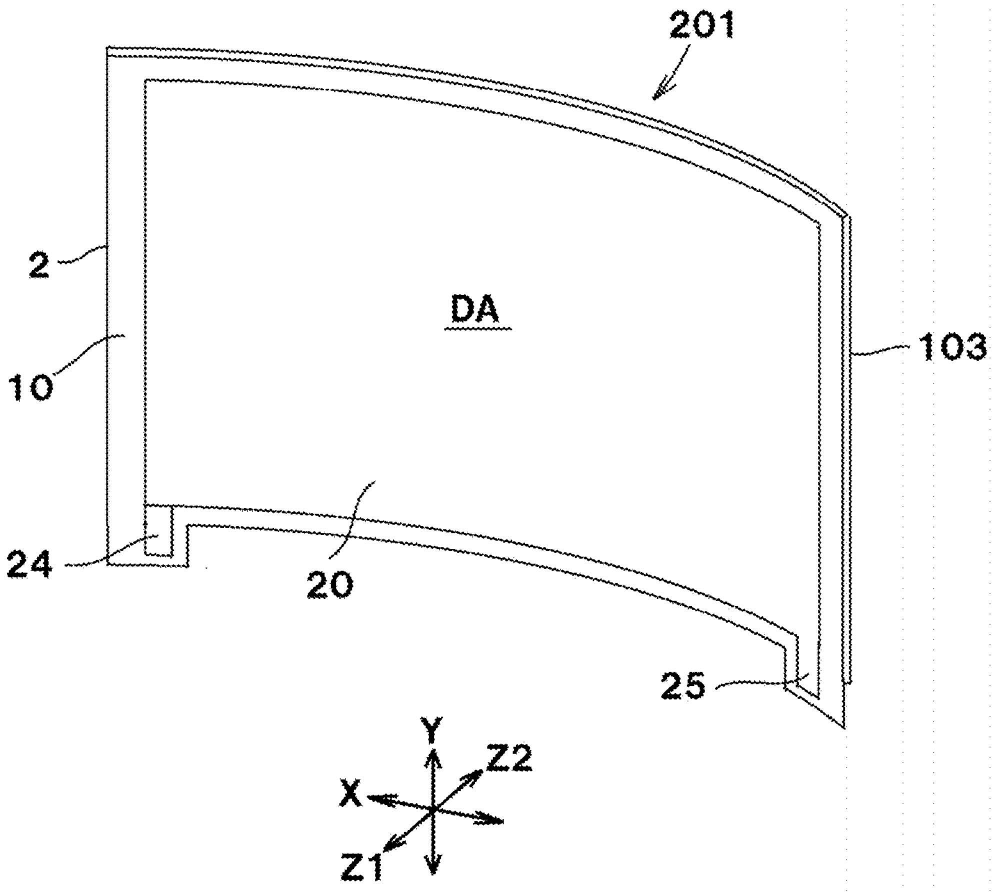
FIG. 7 is a perspective view illustrating a state where the transducer of the third embodiment is assembled.

A transducer 201 of the third embodiment of the present disclosure is illustrated in FIGS. 6 and 7. In the transducer 201, a support member 103 has a curved support plate 30 in which holes 35 are formed. The support plate 30 is curved so that the first surface 31 constitutes part of a cylindrical surface. Specifically, the support plate 30 is two-dimensionally curved so that a radius from an imaginary center line extending in the Y direction in parallel with the first surface 31 is constant. The piezoelectric sheet 2 is stacked and fixed onto the first surface 31 that is a concaved surface side of the support plate 30. The support plate 30 is formed by pressing a metal plate in which holes 35 are formed in advance to curve the metal plate. Alternatively, the support plate 30 may be formed by molding a synthetic resin material into a curved shape. The piezoelectric sheet 2 is bonded to the concaved surface side of the support plate 30 to follow the concaved surface. For the bonding, the piezoelectric sheet 2 and the support member 3 are positioned and bonded so that the holes 35 are positioned within the element region DA of the piezoelectric sheet 2.

In the transducer 201 of the third embodiment illustrated in FIG. 7, the Z1 side, which is the concaved surface side of the support member 3, is used as a sound emitting direction (pressure-wave transmitting direction). As the piezoelectric element 20 of the transducer 201 is operated, pressure waves are emitted from the vibration portions (v). Since the vibration portions (v) are aligned along a concaved surface, the pressure waves can be easily concentrated at a predetermined position in the Z1 direction. In a case where the piezoelectric sheet 2 matches with part of a cylindrical surface, the pressure waves are concentrated at around a center line of curvature of the cylindrical surface. When the transducer 201 is used as a parametric speaker, audibility at an audible spot can be enhanced.

As a configuration of the transducer 201 of the third embodiment, it is also possible to stack and bond the piezoelectric sheet 2 on the second surface 32, which is a convex side of the curved support plate 30. Alternatively, in a similar manner as the transducer 101 illustrated in FIG. 3, the piezoelectric sheet 2 may be interposed between two curved support members 103. In the transducer 201 of the third embodiment, the curvature of the support member 103 is constant in the X direction, but the support member 103 may have a curvature that varies in the X direction depending on the locations, so as to form, for example, a quadratic function curve. Moreover, the support member 103 may have a three dimensionally curved shape having a curvature in both X direction and the Y direction.

In the transducer of each of the above embodiments, the piezoelectric element 20 (or 20A or 20B), which is continuously formed along a sheet surface, is formed on the piezoelectric sheet 2 (or 102), and multiple vibration portions (V) are formed in the single element region DA where the piezoelectric element 20 is formed. Therefore, a formation process of the piezoelectric element 20 is simple compared to formation process for a structure where a plurality of piezoelectric elements are independently aligned on a surface of substrate. Moreover, it is not necessary to individually provide a wiring channel to each of the vibration portions (v), and a wiring structure can be unified. Therefore, a production process is simple, and production can be performed at low cost. Moreover, a size of the piezoelectric element 20 contributing to vibrations of each vibration portion (v) is determined by an inner diameter of each hole 35. By highly precisely machining the holes 35 to have the identical inner diameter, a variation in size of the deformable piezoelectric element 20 within the vibration portions (v) can be minimized so that uniform vibration characteristics can be achieved across all of the vibration portions (v).

Note that, the transducer of each of the above embodiments may be also used as a piezoelectric sensor or an ultrasonic sensor. When ultrasonic waves of approximately 40 kHz are applied to the transducer, the pressure waves thereof cause the piezoelectric element 20 to generate a strain within each vibration portion (v). By measuring the voltage generated between the lower electrode layer 21 and the upper electrode layer 22 of the piezoelectric element when the strain is generated, the ultrasonic waves can be detected.

In the transducer of the above embodiments, the holes 35 having the identical inner diameter face the element region DA of the piezoelectric element 20 that is continuous in the planar direction so that the vibration portions (v) having the same resonance frequency are formed. However, first holes having the same inner diameter and second holes having the same inner diameter may be formed in a vibration plate, and the first holes and the second holes may face the same element region DA. In this case, first vibration portions respectively facing the first holes and second vibration portions respectively facing the second holes can be formed within the same element region DA. Since each first vibration portion and each second vibration portion have mutually different resonance frequencies, ultrasonic waves having different frequencies can be generated simultaneously or alternately from the first vibrating portions and the second vibrating portions by applying a driving voltage corresponding to the resonance frequency of the first holes and/or the second holes. The number of types of holes may be three or more.

What is claimed is:

1. A transducer, comprising:

a flexible substrate;

a piezoelectric element formed on a surface of the flexible substrate, the surface of the flexible substrate having an element region in which the piezoelectric element is continuous in a planar direction of the piezoelectric element; and a support member, in which holes are formed, having a higher rigidity than the flexible substrate, the support member being stacked to the flexible substrate in a manner such that the holes face the element region, wherein the flexible substrate is freely movable in each of the holes, and a region of the flexible substrate corresponding to a region other than the holes of the support member is fixed to the support member.

2. The transducer according to claim 1, wherein inner diameters of the holes facing the element region are identical.

3. The transducer according to claim 1, further comprising another support member to include two support members, wherein the two support members are stacked to both surfaces of the flexible substrate, respectively, in a state in which a center of each of the holes of one of the two support members matches with a center of each of the holes of the other support member, and a region of each of the two support members where the holes are not formed is fixed to the corresponding surface of the flexible substrate.

4. The transducer according to claim 1, wherein the support member stacked to the element region is curved.

5. A method of producing a transducer, the method comprising:

forming an element region, in which a piezoelectric element is continuous in a planar direction, on a surface of a flexible substrate;

forming a support member, in which holes are formed, using a material having a rigidity higher than the flexible substrate; and stacking the flexible substrate to the support member in a manner such that the holes face the element region, allowing the flexible substrate to freely move in the holes, and fixing a region of the flexible substrate, which corresponds to a region other than the holes of the support member, to the support member, to produce the transducer including the flexible substrate, and the piezoelectric element formed on the surface of the flexible substrate.

6. The method according to claim 5, wherein the forming of the element region includes stacking a lower electrode layer, a piezoelectric material layer, and an upper electrode layer on the surface of the flexible substrate in order of the lower electrode layer, the piezoelectric material layer, and the upper electrode layer.

7. The method according to claim 5, wherein the forming of the element region includes disposing a lower electrode layer to a lower surface of a piezoelectric material layer including a polymer piezoelectric material, and disposing an upper electrode layer to an upper surface of the piezoelectric material layer to form the piezoelectric element, and fixing the piezoelectric element to the surface of the flexible substrate.

8. The method according to claim 5, further comprising curving the support member before or after the stacking the flexible substrate to the support member.

* * * * *